April 29, 1941. W. S. MORSE 2,239,794
INSERTED BLADE CUTTER
Filed July 25, 1938
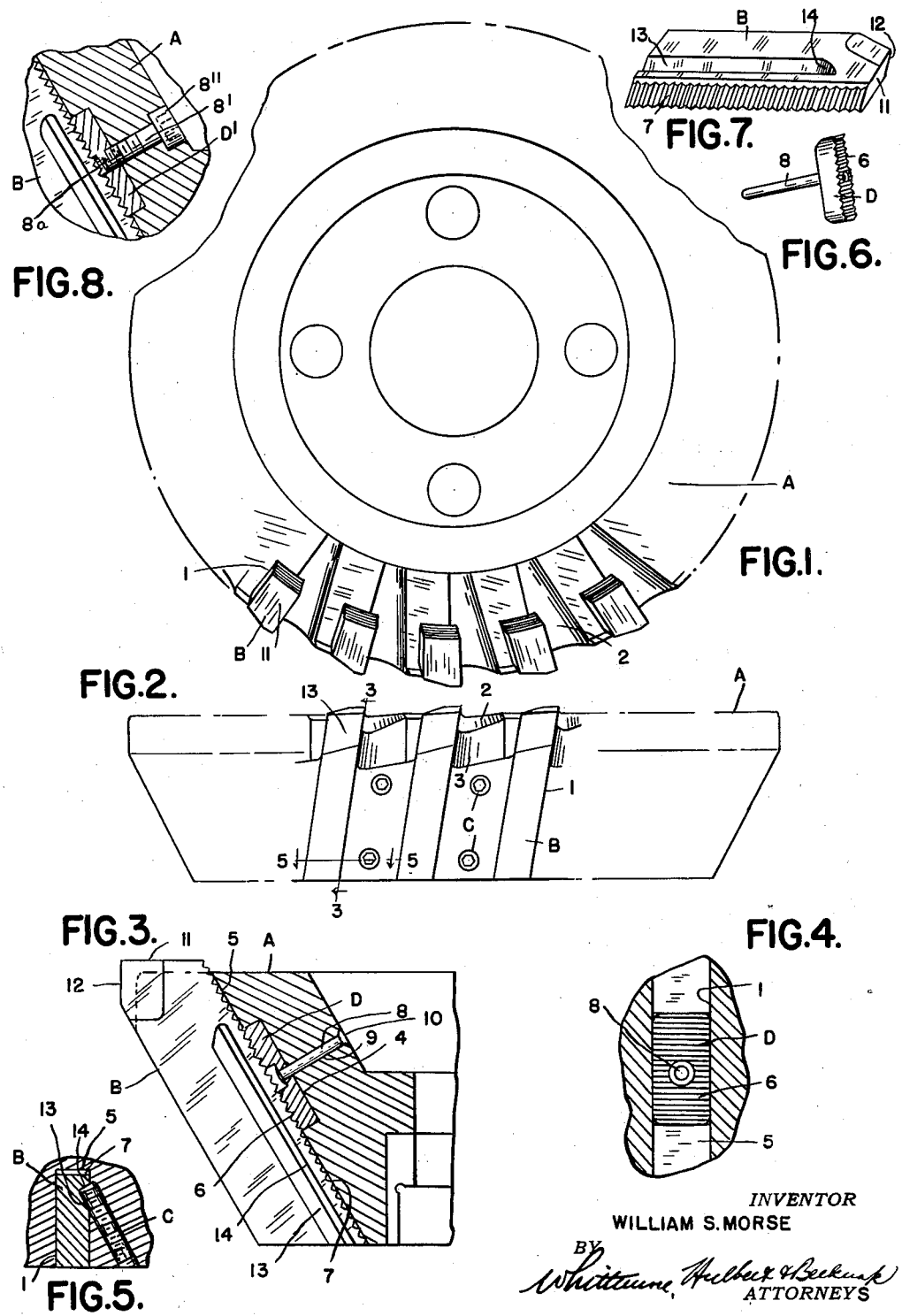
INVENTOR
WILLIAM S. MORSE
BY Whittemore Hulbert & Belknap
ATTORNEYS Patented Apr. 29, 1941

2,239,794

UNITED STATES PATENT OFFICE 2,239,794

INSERTED BLADE CUTTER

William S. Morse, Detroit, Mich.

Application July 25, 1938, Serial No. 221,272

13 Claims. (Cl. 29—105)

This invention relates generally to inserted blade cutters and refers more particularly to rotary cutters of this type wherein the blades are adjustably mounted.

One of the essential objects of the invention is to provide a cutter that is simple in construction and comparatively inexpensive to manufacture.

Another object is to provide a cutter that is constructed in such a way that retaining wedges or other similar parts are dispensed with entirely.

Another object is to provide a cutter wherein the adjustment of the blades may be accomplished easily and quickly.

Another object is to provide a cutter wherein the adjustment referred to is accomplished without having to serrate the cutter head. Thus, my invention avoids the use during manufacture of the cutter of expensive tools heretofore used to form serrations in the head for blades and/or retaining wedges therefor.

Other objects, advantages and novel details of construction of this invention will be made more apparent as this description proceeds, especially when considered in connection with the accompanying drawing, wherein:

Figure 1 is a fragmentary front elevation of a cutter embodying my invention;

Figure 2 is a fragmentary edge elevation thereof;

Figure 3 is a sectional view taken substantially on the line 3—3 of Figure 2;

Figure 4 is a fragmentary plan view with parts broken away and in section;

Figure 5 is a sectional view taken substantially on the line 5—5 of Figure 2;

Figure 6 is a perspective view of one of the pads and its anchorage pin;

Figure 7 is a perspective view of one of the blades;

Figure 8 is a fragmentary sectional view similar to Figure 3 but showing a slight modification.

Referring now to the drawing, A is the head or rotating body, B are the inserted blades, and C are the retaining screws of a cutter embodying my invention.

As shown, the cutter head A is in the form of an annulus and is provided in its periphery with circumferentially spaced, transversely extending slots 1 for the blades. Between these slots the head is provided with suitable slots 2 and 3, respectively, for chip clearance.

To obviate the necessity of serrating the head A, I have provided a series of pads or blocks D that are received in suitable recesses 4 in the bases 5 of the slots 1 and that have serrated outer faces 6 for engagement with the serrated inner edges 7 of the blades B. Preferably these pads D are welded to anchorage pins 8 which in turn are received in suitable bores or holes 9 in the head and are welded as at 10 to said head. As shown, the pads D and blades B have mating serrations which permit the blades B to be adjusted longitudinally of the slots 1 to accomplish the adjustment desired.

In the present instance the blades B are substantially equal in width to the width of the slots 1 and are provided at their forward ends with cutting edges 11 and 12, respectively. At one side of each blade is a longitudinally extending, substantially wedge-shape slot 13 which is provided for the inner end of the retaining screws C. By referring to Figure 3, it will be noted that the lower edge of each blade is serrated throughout its length for engagement with the serrations of the pads D and that the serrated faces of said pads project slightly above the bottom of the slots 1 so that the proper engagement of the serrations of the blades with the serrations of the pads may be obtained.

The retaining screws C threadedly engage the head A at spaced points of the slots 1 and bear firmly against the walls 14 of the longitudinally extending wedge-shape slots 13 in the adjacent sides of the blades. Preferably there are two retaining screws to each blade and they are readily accessible and adjustable from the periphery of the head A.

In the process of construction the pads D are welded to the pins 8 as a sub-assembly before the pins are inserted in the holes 9. After being inserted in place, the inner ends of the pins 8 are then welded to the head as at 10.

Thus, with my construction it is unnecessary to serrate the head A as heretofore in inserted blade cutters. The pads D may be easily and cheaply made and anchored by the pins 8 in the head. Moreover, with my construction the blades B are held effectively in adjusted position in the head by the screws C, two to each blade. Consequently, extra parts such as wedges, etc., have been dispensed with entirely. Therefore, the over-all cost of manufacturing a cutter embodying my invention is decidedly less than heretofore.

In Figure 8 I have shown a slight modification wherein the pad D' is held in place by a screw 8' instead of a pin such as 8. As shown, the head A is counterbored to receive the head 8" of the screw 8' and the exteriorly threaded portion 8ª of said screw threadedly engages the pad D'. Thus, with this construction the pad D' may be readily replaced whenever desired.

What I claim as my invention is:

1. In an inserted blade cutter, a body having a slot for a blade, the base of the slot having a recess, a blade in the slot and provided in opposed relation to the recess with serrations, and means for preventing the blade from moving in the slot, including a pad in said recess and having serrations engaging the serrations of the blade, and means for rigidly securing the pad to the base of the recess including an element connected to the pad and rigidly secured to the body.

2. In an inserted blade cutter, a body having a channel-shaped slot for a blade, a blade in the slot, the base of the slot having a recess, and means for preventing the blade from moving in the slot including a member in said recess and engaging the blade, and means for holding said member against movement including an element rigid with said member and body, said element extending through the body from the base of the recess to the outer side of said body.

3. In an inserted blade cutter, a body having a slot for a blade, a blade in the slot and having serrations, the wall of the slot adjacent said serrations having a recess, and means for preventing the blade from moving in the slot including a pad in said recess and having serrations engaging the serrations of the blade, means rigid with said body and pad for holding the latter against movement, and means engaging said body and blade for maintaining engagement between the serrations of the pad and blade.

4. In an inserted blade cutter, a head having a slot for a blade, a blade in said slot, the base of the slot having a recess therein, and means for holding said blade against movement in the slot including a pad within the recess and having an anchorage pin fixed to said head, mating serrations on the opposed portions of the pad and blade, and means adjustable in the head against the blade to maintain engagement between the mating serrations of the pad and blade.

5. In an inserted blade cutter, a head having a slot for a blade, a blade in said slot, the width of said blade being substantially equal to the width of the slot, one wall of the slot having a recess therein, and means for holding said blade against longitudinal movement in the slot including a pad held against movement within the recess, mating serrations on the opposed portions of the pad and blade, and means for maintaining engagement between the mating serrations of the pad and blade including means adjustable in one wall of the slot for forcing the blade toward said pad.

6. In an inserted blade cutter, a head having a slot for a blade, a blade in said slot, the base of said slot having a recess, means for holding the blade against movement in the slot including means in the recess rigid with the head and engaging the blade, and adjustable means carried by the head and engageable with the blade for maintaining such engagement.

7. In an inserted blade cutter, a body having a slot for a blade, the base of said slot having a recess therein, said body having an open-ended bore with one end thereof opening into the base of the recess, the body also having a threaded bore opening into the slot through a side wall thereof, a blade in the slot, retaining means for the blade including a member located within and substantially conforming in shape and size to said recess, said member and blade having mating serrations preventing movement of the blade longitudinally of the slot, anchorage means for the member located in the open-ended bore, and adjustable means in the threaded bore engageable with a recess in the adjacent side of the blade for maintaining the mating serrations aforesaid in engagement with each other.

8. In an inserted blade cutter, a body having a slot for a blade, the base of said slot having a recess therein, said body having an open-ended bore with one end thereof opening into the base of the recess, a blade in said slot, means for holding the blade against movement in said slot including a member in said recess and engaging the blade, and means located within said bore and rigid with said body for holding said member rigid with said body.

9. In an inserted blade cutter, a body having a blade receiving slot therein and a bore opening into the slot through a side wall thereof, the base of the slot having a recess therein, said body also having an open-ended bore with one end thereof opening into the recess, a blade in said slot, and means for holding said blade against movement relative to the body including a member in the recess engaging the blade, anchorage means for said member located in the second mentioned bore, and means in the first mentioned bore exerting a pressure against said blade toward the member in the recess in the base of said slot.

10. In an inserted blade cutter, a body having a blade receiving slot therein and a bore opening into the slot through a side wall thereof, the base of the slot having a recess therein, said body also having an open-ended bore with one end thereof opening into the recess, a blade in said slot, and means for holding said blade against movement relative to the body including three members, one being in the first mentioned bore and engaging the blade, another being in the recess and engaging the blade, and a third being in the second mentioned bore and connected to the second mentioned member.

11. In an inserted blade cutter, a head having a blade receiving slot therein, a blade in said slot, the base of the slot having a recess therein, and means for holding the blade against longitudinal movement in the slot including a pad held against movement within the recess and engaging the blade, and means for maintaining engagement between the pad and blade including a member adjustable in one wall of the slot relative to said blade.

12. In an inserted blade cutter, a body having a blade receiving slot therein, the base of said slot having a recess therein, said body having an open-ended bore with one end thereof opening into the recess through the base thereof, the body also having a threaded bore opening into the slot through a side wall thereof, a blade in the slot, and retaining means for the blade including a member within said recess and engaging the blade, anchorage means for the member located in the open-ended bore, and adjustable means in the threaded bore engageable with the blade for maintaining the engagement aforesaid between said member and blade.

13. In an inserted blade cutter, a body having a blade receiving slot therein, the base of said slot having a recess therein, a blade in said slot, and means for holding the blade in the slot against movement relative to the body including a member in the recess and engaging the blade, said member being fixed to said body, and means adjustable in one wall of the slot to maintain the engagement aforesaid between the blade and member.

WILLIAM S. MORSE.